April 30, 1968   C. E. STROUD ET AL   3,380,145
METHOD OF FABRICATING MULTIPLE GLAZING UNIT
Original Filed Jan. 8, 1964   2 Sheets-Sheet 2
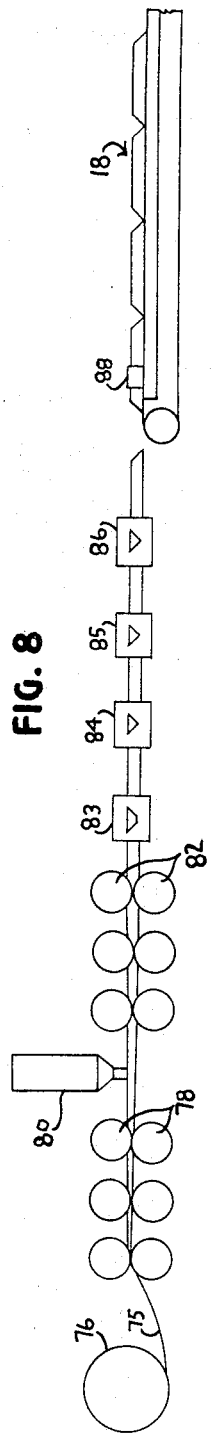
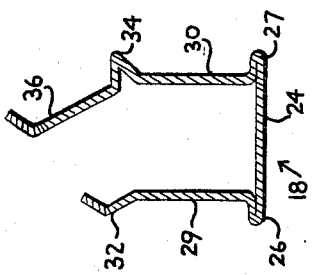
INVENTORS
CHARLES E. STROUD
HERBERT C. CERUTTI
THOMAS H. HUGHES
Chisholm and Spencer
ATTORNEYS

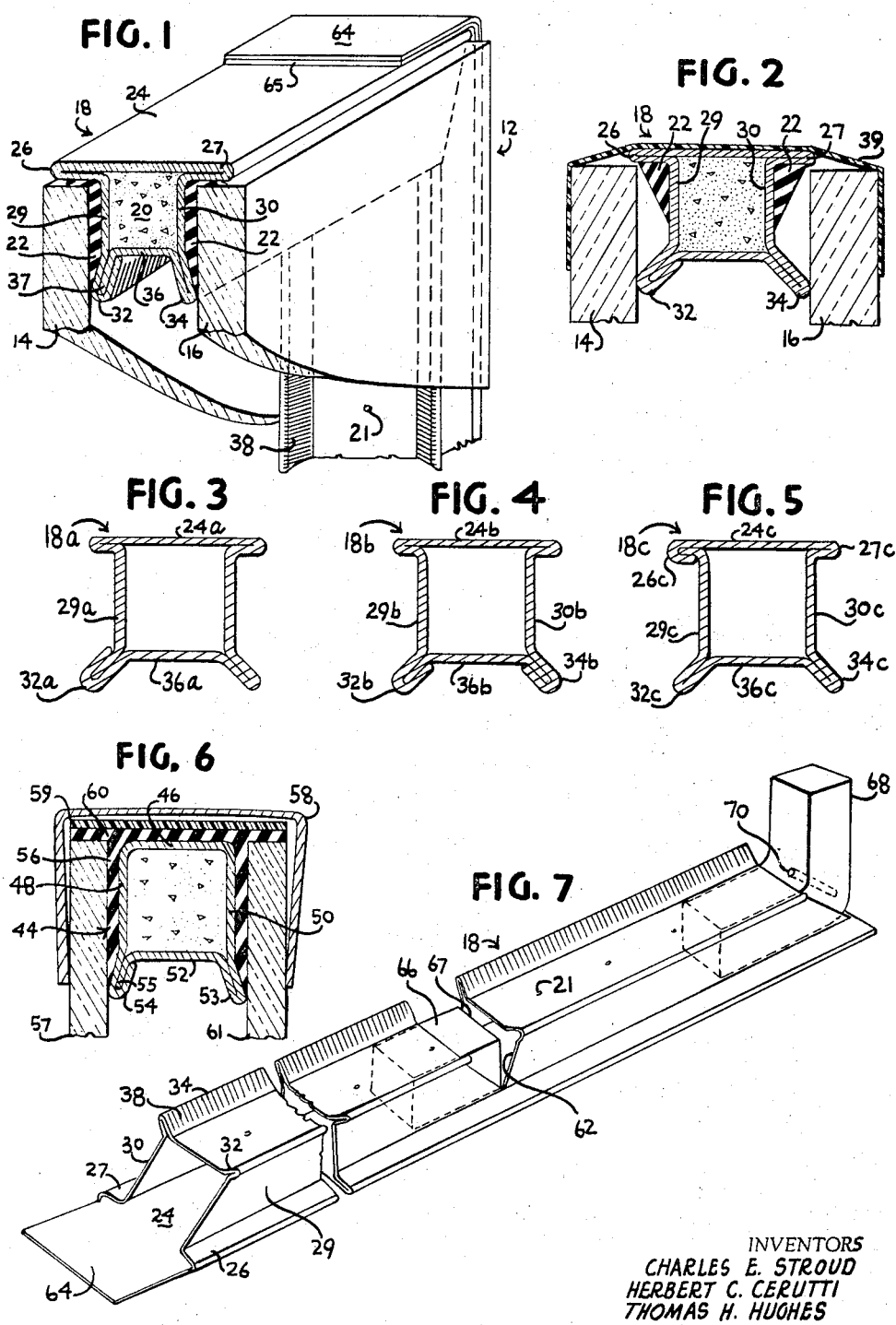

3,380,145
METHOD OF FABRICATING MULTIPLE GLAZING UNIT

Charles E. Stroud, Natrona Heights, and Herbert C. Cerutti and Thomas H. Hughes, Sarver, Pa., assignors to Pittsburgh Plate Glass Company, Pittsburgh, Pa., a corporation of Pennsylvania
Original application Jan. 8, 1964, Ser. No. 336,600, now Patent No. 3,280,523, dated Oct. 25, 1966. Divided and this application Aug. 2, 1965, Ser. No. 476,506
3 Claims. (Cl. 29—411)

This is a division of application Ser. No. 336,600, filed Jan. 8, 1964, now Patent No. 3,280,523.

This invention relates to method of fabricating a multiple glazing window unit and more particularly to a method of fabricating an element for spacing two glass sheets of such a unit from each other about the periphery of the unit.

Multiple glazing units comprise two or more sheets of glass spaced from one another to provide an insulating air space between the sheets. This air space is effective for reducing the passage of heat through the unit due to conduction and convection. The sheets of glass are spaced from each other by a marginal edge spacing element. The glass sheets are adhered to the spacer element by a mastic composition applied in a continuous film around the edges of the sheets between each sheet and the spacing element to provide a hermetic seal. Preferably, the peripheral edges of the glass sheets forming the multiple glazing unit are protected by outwardly extending flanges of the spacing element or by a separate metal channel member of U-shaped cross section that is affixed over the edges of the assembled unit. The spacing elements are generally tubular in shape and filled with a desiccant. Openings in the spacing element communicate between the air space of the unit and the inside, tubular portion, of the element so that moisture from the air within the unit will be absorbed.

One conventional method of assembling multiple glazing units is to apply a layer of bead or mastic along two opposite sides of the spacing element, which sides are adapted to engage the inner surfaces of the glass sheets about the marginal edges. The spacing element is then placed between two precut glass sheets and the sheets are pressed together to adhere the sheets to the spacing element and to seal the internal air space between the sheets from the atmosphere. The final air space between the two glass sheets is a function of the thickness of the spacing element and the thickness of the mastic layers between each side of the spacing element and the adjacent glass sheet.

In the fabrication of a multiple glazing unit as above described, the pressing operation often squeezes the mastic from between the glass sheets and the spacing element and into the viewing area of the unit inwardly of the marginal edges. Because the mastic is opaque, the effect is unsightly.

The spacing element of the present invention is constructed to prevent the inward flow of mastic into the viewing area of the unit during the pressing operation and, to this end, includes a pair of flanges along the outside of a tubular spacing element that are adapted to be positioned between the two glass sheets of the unit inwardly of the marginal edges. These flanges extend along the lateral sides of the spacing element and are bent outwardly from the element to contact the inner surfaces of the glass sheets. The flanges are bent outwardly a distance sufficient to assure their contact with the facing surfaces of the spaced glass sheets before the mastic is squeezed into the viewing area during the pressing operation. The flanges are sufficiently flexible that they yield in response to the pressing operation, permitting the glass sheets to be pressed closer together. As a result, the mastic is spread to provide a thin, but relatively wide and, hence, effective seal between the spacing element and the glass. As the mastic spreads, the flanges provide an efficient dam against the inward flow of the mastic into the visible area of the unit. Because only the flanges yield, while the tubular spacing portion of the element remains rigid, the element may be fabricated from a very light weight, thin, material and yet form a very rigid and strong structure. In addition, the yielding of the flanges extends the width (i.e., distance inwardly from the marginal edges) of the mastic forming the vapor seal so that a wide but thin band is formed through which any moisture must permeate before reaching the interior air space of the unit. The width assures a long moisture resistant path and the thinness minimizes the critical zone through which moisture tends to permeate. In addition, the construction of this unit lends itself to a maximum economy of fabrication, materials and equipment. Such economy is attained through the use of rolling equipment for shaping the spacing element to form a unitary element that may be cut to length, notched to form mitered corners for the desired rectangular shape, and filled with a desiccant, all in a continuous operation.

Other advantages of the invention will become apparent from the following detailed description of certain embodiments thereof taken in conjunction with the drawings in which:

FIG. 1 is a fragmentary, perspective view, partly in section, of a multiple glazing unit embodying the principles of the invention and omitting, for clarity, an optional edge-covering tape;

FIG. 2 is a fragmentary sectional view of the multiple glazing unit of the type shown in FIG. 1 prior to the pressing operation that results in the finished unit shown in FIG. 1;

FIG. 3 is a sectional view of the second embodiment of a spacing element embodying the principles of the invention;

FIG. 4 is a sectional view of a third embodiment of a spacing element embodying the principles of the invention;

FIG. 5 is a sectional view of a fourth embodiment of a spacing element embodying the principles of the invention;

FIG. 6 is a fragmentary sectional view of a multiple glazing unit of a different type from that shown in FIGS. 1 and 2 and shows a fifth embodiment of a spacing element embodying the principles of the invention;

FIG. 7 is a fragmentary perspective view of the spacing element of FIG. 2 after forming but prior to being assembled into a rectangular shape;

FIG. 8 is a schematic process diagram illustrating a preferred process of forming the spacing element of FIG. 7; and FIG. 9 is a sectional view of the spacing element of FIG. 7 showing an intermediate shape during the forming process.

In the drawings, and with particular reference to FIG. 1, a multiple glazing unit 12 is shown comprising two sheets of glass 14 and 16 arranged in parallel relationship. The glass may be tempered, colored, laminated or have other special strength or optical properties. The glass sheets are separated at their marginal edges of a continuous spacer element 18. The spacer element 18 includes a tubular portion of rectangular cross section that is filled with a desiccant 20. An example of a suitable desiccant is granular or powered silica gel. Communication between the air space between glass sheets 14 and 16 and the desiccant 20 is provided through holes 21 in spacer element 18. The spacer element 18 extends completely about the unit 12 and between the marginal edges of the glass sheets.

The spacer element 18 is adhered to the glass sheets 14 and 16 at their inner faces by means of a thin continuous film of an adhesive, moisture resistant, mastic composition 22. Curable synthetic polymeric adhesive sealants, such as initially flowable, cure-in-place, polysulfide based sealants, are suitable for this purpose.

Spacer element 18 is formed of a continuous strip of thin metal, such as an aluminum alloy, preferably of a thickness between 0.004 and 0.015 inch. At these thicknesses, the metal is readily formable, is moisture impervious and is sufficiently rigid for its intended purpose when formed in the shapes herein disclosed. The metal is bent in the general form of a tubular member having a flat side 24 of a single thickness of metal with flanges 26 and 27 along each edge of flat side 24 in the same plane thereof and formed by bending the metal of flat side 24 back upon itself for a distance equal to the desired width of the flanges. Two spaced sides 29 and 30 of sapcer element 18 are formed of a single thickness of metal and perpendicular to flat side 24 at the junctures of flanges 26 and 27. The spaced sides 29 and 30 are formed by bending extensions of the sheet of metal forming flat side 24 and flanges 26 and 27 at right angles from the terminal portions of flanges 26 and 27.

Two additional flanges 32 and 34 at the distal ends of the two spaced sides 29 and 30 are formed from the sheet metal of each of the two spaced sides by bending the metal of each back upon itself a distance equal to the desired width of the flanges. The flanges 32 and 34 extend in a direction generally away from flanges 26 and 27, and inwardly of the marginal edges of a unit 12. They are also bent outwardly from the planes of the spaced sides 29 and 30 relative to the unit 12 at an angle less than 90 degrees so that they diverge from each other and contact the inner surfaces of glass sheets 14 and 16. A web 36 extending from the flange 34 spans the distance between spaced sides 29 and 30, parallel to flat side 24 but spaced therefrom, and is located at the junctures of flanges 32 and 34 and their respective spaced sides 29 and 30. A terminal portion 37 of web 36 is located between the two thicknesses of sheet metal forming flange 32. Flanges 32 and 34 are each knurled on their inner facing surfaces, as at 38, to provide rigidity.

The web 36 contains spaced apertures 21 providing passageways allowing circulation of air between the air space of the unit and the desiccant chamber in spacing element 18. This construction provides openings controlled in size and independent of the position of the sides or flanges of the spacing element, and thereby substantially eliminates the escape of fine particles of desiccant into the visual area of the unit 12.

Flanges 32 and 34, by virtue of the thin metal of which the spacing element is constructed and the bracing afforded by web 36, are flexible about the juncture of web 36 and spaced sides 29 and 30. The significance of this relationship may be better appreciated in connection with FIG. 2 disclosing the spacer element 18 and the glass sheets 14 and 16 just prior to the pressing operation that forms the finished unit shown in FIG. 1.

As shown in FIG. 2, the mastic composition 22 has been applied to element 18 adjacent flanges 26 and 27 and spaced sides 29 and 30. The major portion of the mastic is located close to flanges 26 and 27. Inner flanges 32 and 34 are bent outwardly from the planes of spaced sides 29 and 30 at an angle, preferably of between about 30 to 60 degrees, but in all events less than 90 degrees. The flanges 32 and 34 extend a distance sufficient to facilitate their contacting the inner surfaces of glass sheets 14 and 16 before there is substantial displacement of mastic 22 by the glass sheets during the pressing operation, Glass sheets 14 and 16, in the relationship shown in FIG. 2, are pressed towards each other to form the unit shown in FIG. 1. Movement of the glass sheets bends flanges 32 and 34 about the corners formed by spaced side walls 29 and 30 and web 36. As the movement of the glass sheets diminishes the space between the side wall 29 and the glass sheet 14, and the side wall 30 and the glass sheet 16, the mastic flows inwardly of the peripheral edges of the unit towards flanges 32 and 34 and the visual zone of the unit. However, contact between the glass sheets and the tips of flanges 32 and 34 prevents the flow of the mastic beyond the zone of contact and, instead, any excess mastic is force to escape beneath flanges 26 and 27. As flanges 32 and 34 straighten, the width of the vapor seal provided by the mastic 22 increases and the thickness decreases. A width of at least ¼ inch has been found desirable, and the straightening of flanges 32 and 34 facilitates maximum width. The thickness of the mastic will vary across the width of the seal because the pressing pressure often causes a slight dish-shaped deformation in side walls 29 and 30. Preferably, the mastic thickness will not be greater than 0.010 inch and in any event not thicker than 0.025 inch. The mastic thickness over most of the width of the seal is less than 0.005 inch.

It has been found desirable to apply a thin, flexible, film of adhesive tape 39 about the periphery of the unit 12, as shown in FIG. 2, to restrain any excessive outward flow of mastic from beneath flanges 26 and 27. For clarity, this tape, the use of which is optional, has been omitted from the finished unit shown in FIG. 1.

FIGS. 3, 4, and 5 disclose alternative ways of constructing a spacer element to have the same general configuration of spacer element 18. Thus, in FIG. 3, a spacer element 18a is constructed in the same manner as spacer element 18 except for flange 32a, which is formed by doubling the terminal portion of web 36a over a terminal portion of side 29a. In FIG. 4, a spacer element 18b is shown of the same configuration as spacer element 18 but formed of two separate pieces. Sides 24b, 29b and 30b are formed of one piece and web 36b is formed of a separate piece. Terminal portions of web 36b are clamped along each side within the terminal portions of sides 29b and 30b that are bent back upon themselves to form flanges 32b and 34b.

The embodiment of FIG. 5 shows a spacer element 18c of the same general configuration as spacer element 18 but with the closure of the tube located at flange 26c instead of at flange 32 as in FIGS. 1 and 2. It will be evident from this embodiment that the tubular spacing element may be joined at any corner. Alternatively, the element 18c could be formed of two separate pieces of metal. Flat side 24c could be formed of a single piece of metal with longitudinally extending edges bent back upon themselves to form both flanges 26c and 27c at terminal portions in the manner now shown only at 26c in FIG. 5. Spaced sides 29c and 30c, flanges 32c and 34c and web 36c would then all be formed from a second piece of metal and joined with flat side 24c by terminal portions clamped between the folded back portions of flanges 26c and 27c.

It will be readily understood that, while flat sides 29 and 30 provide the thinnest mastic layer and, hence, diminish the opportunity for vapor diffusion and provide resistance to compression along their entire length due to web 36 and the desiccant 20, the sides may be curved or sloped while still utilizing flanges 32 and 34 to prevent the inward flow of mastic. It is also contemplated that spacing element 18 may be extruded, or formed to the desired shape from tubular stock rather than from a sheet or ribbon, and in either case have no seams or terminal portions to be joined.

An embodiment of different configuration is shown in FIG. 6 of the drawings. This embodiment is similar to the embodiment of FIGS. 1 and 2 but omits outer flanges 26 and 27. Thus, a spacer element indicated generally at 44 is formed of a single sheet of thin material such as aluminum sheet or foil and bent to form a generally rectangular-shaped, tubular, spacing element. A flat side 46 and two spaced sides 48 and 50 extending in the same direction therefrom and perpendicular thereto, and a web portion 52 parallel to flat side 46 but spaced therefrom, form a rectangular tube. A flange 53 extending from the juncture of side 50 and web 52 is formed by bending the metal forming side 50 outwardly of the plane of the side at an angle less then 90 degrees and then back upon itself for a distance equal to the desired length of the flange. Web 52 is then formed by an extension of the metal forming flange 53. A flange 54 is formed at the juncture of side 48 and web 52 by bending the metal forming side 48 outwardly from the plane of the side at an angle less than 90 degrees and then back upon itself for a distance equal to the desired length of the flange. A terminal portion 55 of web 52 is engaged between the folded back portion of the metal forming flange 54 to complete the element. Mastic 56 between the sides 48 and 50 and the adjacent glass sheets 57 and 61 adheres the parts together and forms a moisture impervious seal in the same manner as disclosed with reference to FIGS. 1 and 2. Flanges 53 and 54 function in the same manner as flanges 32 and 34.

Where desired, a channel member 58 of U-shaped cross section may be affixed around the periphery of the unit of FIG. 6. The channel member 58 is made of metal, such as stainless steel. The angle that the flanges or sides of the channel member form with the central portion is slightly less than 90 degrees. When the channel member is affixed to the edges of the glass sheets, these sides are held apart to allow the glass to be inserted therein. The sides are then released and they spring back into contact with the faces of the glass sheets. The channel members are thus held on under tension. A resilient, moisture resistant, strip 59 with a layer of mastic 60 adhered thereto is preferably placed between the channel member 58 and flat side 46 of spacer element 44 about the peripheral edges of the glass sheet.

FIG. 7 illustrates the construction of the spacer element 18 that facilitates the continuously formed tubular spacer element to be fabricated into a rectangular shape. The continuous element 18 is notched as at 62 at three spaced intervals corresponding to the desired dimensions of the finished unit. The angle of the V of notches 62 is 90 degrees and the apex of the V of the notch terminates at the juncture of flanges 26 and 27 and their respective sides 29 and 30. Flat side 24 is then bent until the two edges of each V-shaped notch 62 meet each other to form a mitered corner. Each end of the spacer element 18 is cut at 45 degrees and at one end flat side 24 extends beyond side walls 29 and 30 to form a terminal flap 64. This flap folds over the other terminal end of the continuous spacer element 18 when the two ends are placed in abutting relationship to form the fourth corner of the rectangular unit. Flap 64 is then fastened in the position shown in FIG. 1 with mastic at 65.

At each of the three notches 62 a plug 66 of flexible, rubber-like material is inserted in the position shown in FIG. 7. Plug 66 is essentially of the same cross-sectional shape as that of the tubular portion of the spacing element 18. One end 67 is aligned with the apex of the associated notch 62 so that the notch is substantially sealed from the desiccant 20 when the spacing element is bent at right angles at each notch. As will be explained below, the desiccant is temporarily restrained within element 18 by mastic placed in each corner during fabrication. A bent plug 68 of like construction to plug 66 seals the mastic and desiccant at each end of element 18 when the terminal ends are placed in abutting relationship. A hole 70 allows air within the unit 12 to escape through the corner as the air space is diminished during the pressing operation. Flow of mastic 22 by the completion of the pressing operation and mastic 65 of flap 64 prevent further communication between the ambient atmosphere and the air space through hole 70 once flap 64 is sealed.

The process by which the spacing element 18 is constructed and the multiple glazing unit 12 fabricated may be best understood in connection with the schematic processing layout shown in FIG. 8.

A continuous ribbon of metal 75 is fed from a coil 76 through rolling dies 78 and progressively formed by conventional techniques into the cross sectional channel shape shown in FIG. 9. Particulate desiccant is deposited into the channel from a hopper 80 to a level substantially even with the junctures of flanges 32 and 34 with walls 29 and 30. The desiccant, by substantially filling the spacing element 18 (i.e., filling at least 80 percent of the volume and, preferably, at least 90 percent) lends additional strength and rigidity to the unit. Subsequent rolling dies 82 close web 36 to form a tubular member of the shape shown in FIG. 2. Knurl marks 38 and holes 21 are formed during this subsequent rolling operation.

A desired length of the formed tubular spacing element 18 is severed at a 45 degree angle, leaving an extending flap 64, and right angle V-notches 62 are cut in sides 29 and 30 by spaced cutting dies 83, 84, 85 and 86 in a conventional manner. Because of the additional rigidity imparted to element 18 by the desiccant, there is little or no distorting of the spacing element from the cutting dies. During the notching and severing operation, a mastic composition is extruded into the tubular portion of element 18 at each notch and at the severed end to temporarily restrain the desiccant from escaping.

A bead or layer of mastic is next applied along sides 29 and 30 of spacing element 18 as it moves past beading applicators indicated at 88. A plug 66 is then manually inserted into each of the three notches 62 and a bent plug 68 is inserted into one end of the element 18. The element 18 is then manually bent to a rectangular shape by folding it at each notch and is placed upon a horizontally disposed, pre-cut glass sheet about the marginal portion of the upper surface thereof. A second pre-cut sheet of glass of similar shape and dimensions to the first is then placed upon the spacing element in superposed relationship with the lower sheet. Preferably, a strip of flexible adhesive tape is applied about the periphery of the assembled unit. The sheets of glass are pressed toward each other to adhere them to the spacing element and to seal the inside air space from the ambient atmosphere.

Although the present invention has been described with particular reference to the specific details of certain embodiments thereof, it is not intended that such details shall be regarded as limitations upon the scope of the invention except insofar as included in the accompanying claims.

We claim:

1. In a method of forming a rectangular spacing element having mitered corners for a multiple glazing unit, the steps comprising forming a channel having a base, two extending sides and an open portion oriented upwardly; depositing desiccant into said channel through said open portion; closing said channel to form a tube containing the desiccant; cutting three 90 degree notches at spaced locations along said tube; and bending said tube at right angles at the three notches to form a rectangular spacing element.

2. In a method of forming a spacing element for a multiple glazing unit, the steps comprising forming a channel having a base, two extending sides and an open portion oriented upwardly; depositing desiccant into said channel through said open portion; closing said channel to form a tube containing the desiccant; thereafter severing a portion of said tube from a remaining portion at a 45 degree angle and cutting three 90 degree notches at spaced locations along said tube; extruding a mastic into said tube at each severed and notched portion to retain the desiccant within the tube; inserting a separate plug into said tube at which of the three notches and at one of the severed ends; and bending said tube at right angles at the three notches to form a rectangular spacing element.

3. In a method of forming a multiple glazing unit, the steps comprising forming a spacing element by continuously and progressively roll forming a moving thin sheet or ribbon of malleable material into the general form of a longitudinally extending channel having a base, two extending sides and an open portion oriented upwardly; depositing a particulate desiccant into said channel through said open portion, closing said channel to form a tube containing the desiccant, thereafter severing a portion of said tube from a remaining portion at a 45 degree angle and cutting three 90 degree notches at spacer locations along said tube, extruding a mastic into said tube at each severed and notched portion to retain the desiccant within the tube, inserting a separate plug into said tube at each of the three notches and at one of the severed ends, applying a layer of mastic on two opposite sides of the spacing element along the length thereof, bending said tubes at right angles at said three notches to form a rectangular spacing element, forming an assembly by placing said spacing element upon a first pre-cut, rectangular-shaped, sheet of glass with the element adjacent marginal edges of the sheet, placing a second similar sheet of glass upon the spacing element in superposed relationship to the first sheet, applying a flexible adhesive tape about the periphery of the assembly and thereafter pressing the two sheets of glass toward each other to seal the sheets to the spacing element with the mastic.

References Cited

UNITED STATES PATENTS

| | | | |
|---|---|---|---|
| 1,836,354 | 12/1931 | Abrams | 29—476 |
| 1,913,205 | 6/1933 | Lenhart | 52—172 |
| 2,219,595 | 10/1940 | Lang | 29—476 |
| 2,127,618 | 8/1938 | Riemenschneider | 29—417 |
| 2,742,690 | 4/1956 | Kunkel | 29—417 |
| 3,030,673 | 4/1962 | London | 52—172 |
| 3,105,274 | 10/1963 | Armstrong | 52—616 X |
| 3,284,889 | 11/1966 | Flitman et al. | 29—411 |
| 2,964,809 | 12/1960 | Gwyn et al. | 29—455 X |
| 3,212,179 | 10/1965 | Koblensky | 29—455 X |

CHARLIE T. MOON, *Primary Examiner.*

UNITED STATES PATENT OFFICE
CERTIFICATE OF CORRECTION

Patent No. 3,380,145                              April 30, 1968

Charles E. Stroud et al.

It is certified that error appears in the above identified patent and that said Letters Patent are hereby corrected as shown below:

Column 6, line 74, "at which" should read -- at each --.
Column 7, line 13, "spacer" should read -- spaced --.

Signed and sealed this 23rd day of September 1969.

(SEAL)
Attest:

Edward M. Fletcher, Jr.                       WILLIAM E. SCHUYLER, JR.
Attesting Officer                              Commissioner of Patents